(12) United States Patent
Tsukada et al.

(10) Patent No.: US 7,210,851 B2
(45) Date of Patent: May 1, 2007

(54) ARRANGEMENT STRUCTURE OF BEARINGS

(75) Inventors: Yoshiaki Tsukada, Saitama (JP); Takashi Ozeki, Saitama (JP); Shinji Furuta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 107 days.

(21) Appl. No.: 11/037,245

(22) Filed: Jan. 19, 2005

(65) Prior Publication Data

US 2005/0157966 A1 Jul. 21, 2005

(30) Foreign Application Priority Data

Jan. 20, 2004 (JP) ............... 2004-011871

(51) Int. Cl.
*F16C 19/54* (2006.01)
*F16H 1/06* (2006.01)

(52) U.S. Cl. .................... 384/537; 74/413

(58) Field of Classification Search ........... 384/537, 384/546, 547, 461; 74/413, 606 R
See application file for complete search history.

(56) References Cited

U.S. PATENT DOCUMENTS 4,899,620 A   2/1990   Schiffer 5,634,384 A *  6/1997  Hofmann ............... 74/606 R

FOREIGN PATENT DOCUMENTS

DE   43 05 133 A1   8/1994
JP   3039168 B2    3/2000

OTHER PUBLICATIONS

Patent Abstracts of Japan, Publication No. 05157156A, published Sep. 22, 1993.
Patent Abstracts of Japan, Publication No. 06173963A, published Jun. 21, 1994.

* cited by examiner

*Primary Examiner*—Thomas R. Hannon
(74) *Attorney, Agent, or Firm*—Birch, Stewart, Kolasch & Birch, LLP (57) ABSTRACT

To provide an arrangement structure for bearings which overlap in the axial direction. A driven shaft and an intermediate shaft are linked to each other and are disposed to be substantially parallel with respect to each other. The driven shaft and the intermediate shaft are rotatably supported via the radial ball bearings, respectively with the respective radial ball bearings being disposed so as to overlap partly with each other in an axial view. An inner wall portion for supporting the respective radial ball bearings is provided with the respective radial ball bearings being mounted to the inner wall portion substantially in the same direction.

14 Claims, 8 Drawing Sheets

ARRANGEMENT STRUCTURE OF BEARINGS

CROSS-REFERENCE TO RELATED APPLICATIONS

The present application is related to Japanese Patent Application No. 2004-011871 filed on Jan. 20, 2004 the entire contents of which are hereby incorporated by reference.

BACKGROUND OF THE INVENTION

1. Field of the Invention

The present invention relates to an arrangement of bearings for a plurality of torque transmission elements.

2. Description of Background Art

FIG. 3 of Japanese Patent No. 3,039,168 discloses a structure for bearings in which a plurality of power transmission shafts are linked to each other and are arranged to be substantially parallel to each other for rotatably supporting the respective power transmission shafts via the bearings respectively.

This technology has a structure in which the respective bearings are mounted to wall portions which support the bearings from both sides, so that the respective bearings are partly overlapped when viewed in an axial view.

However, in the structure of bearings as described above, although the center distance between the power transmission shafts can be reduced, since the bearings which are overlapped with each other in an axial view are mounted to the wall portion from the opposite directions, the assembly of a unit including these bearings may present problems. When considering maintenance of the bearings or the like by disassembling the unit, since the structure of the wall portions is complicated, the maintenance may present problems.

SUMMARY AND OBJECTS OF THE INVENTION

Accordingly, the present invention provides a structure for bearings for improving assembleability and maintenanceability of the respective bearings which overlap in the axial direction.

As a solution to the above described problem, the present invention provides a structure for bearings that includes a plurality of power transmission shafts, for example, a driven shaft 60, an intermediate shaft 73, that are linked to be substantially parallel to each other with the power transmission shafts that are rotatably supported via bearings, for example, radial ball bearings 87, 88, respectively, and arranged so that the bearings are overlapped partly with each other in an axial view. A wall portion is provided for supporting the respective bearings, for example, an inner wall portion 59C, with the respective bearings being mounted to the wall portion substantially in the same direction.

In this structure, when assembling the unit including the respective bearings, the respective bearings may be mounted to the wall portion substantially in the same direction. Likewise, maintenance of the respective bearings can be performed substantially in the same direction.

The present invention provides a wall portion that is formed with a recess, for example, a storage section 95, so that a first bearing, for example, the radial ball bearing 88, of the bearings is disposed on the far side of a second bearing, for example, the radial ball bearing 87, of the bearings in terms of the mounting direction of the respective bearings with the bearings being overlapped to each other in axial view.

In this arrangement, when mounting the respective bearings to the wall portion, the first bearing is mounted to the wall portion in a state of being disposed within the recess to be placed on the far side in terms of the mounting direction, and then the second bearing is mounted to the wall portion.

The present invention provides a bearing holder, for example, a bearing holder 100, for surrounding and retaining the second bearing with the second bearing being mounted to the wall portion via the bearing holder. In this arrangement, the second bearing can be supported via the bearing holder over the entire perimeter.

The present invention includes a first bearing that is disposed between the second bearing and the wall portion in the axial direction. In this arrangement, the first bearing can be interposed between the second bearing and the wall portion.

The present invention includes a space that is formed between the second bearing and the first bearing in the axial direction. In this arrangement, the parts tolerance of the respective bearings in the axial direction and the mounting tolerance with respect to the wall portion can be absorbed.

According to present the invention, assembleability and maintenanceability of the respective bearings can be improved.

According to the present invention, mounting of the respective bearings are facilitated, and the assembleability thereof can further be improved.

According to the present invention, the mounting force of the second bearing with respect to the wall portion can be improved.

According to the present invention, the mounting force of the first bearing with respect to the wall portion can be improved.

According to the present invention, mounting accuracy of the respective bearings can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Referring now to the drawings, embodiments of the present invention will be described. Terms representing the directions such as front, rear, left and right correspond to the directions with respect to a vehicle.

Figure 1:
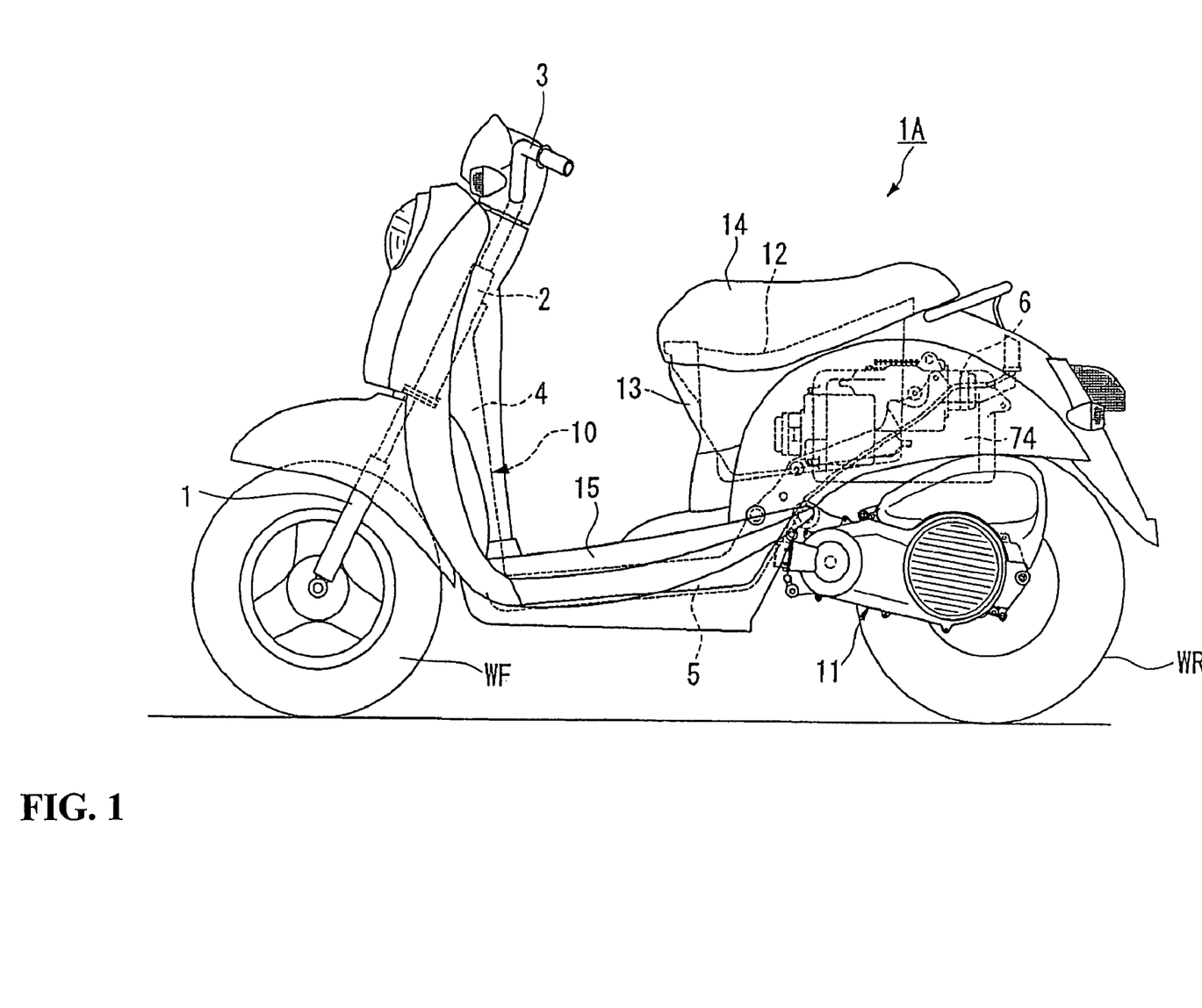
FIG. 1 is a side view of a motorcycle according to an embodiment of the present invention.

FIG. 1 illustrates a unit swing system motorcycle 1A configured as a hybrid vehicle. The motorcycle 1A includes a front fork 1 which rotatably supports a front wheel WF at the front of the vehicle body. The front wheel WF and the front fork 1 are rotatably supported by a head pipe 2, so as to be capable of steering by operating a handle 3. A down pipe 4 is mounted to the head pipe 2 so as to extend rearwardly and downwardly with an intermediate frame 5 extending substantially horizontally from the lower end of the down pipe 4.

A rear frame 6 is formed rearwardly and upwardly from the rear end of the intermediate frame 5. The front end of a power unit 11 includes an engine 20 as a prime mover of the motorcycle 1A, which will be described later, that is rotatably attached to a vehicle body frame 10 configured as described above. The power unit 11 is of the so-called unit swing system which swings in the vertical direction about the front end thereof, which is rotatably mounted to the vehicle body frame 10. A rear wheel WR, which is a drive wheel, is rotatably mounted to the rear end of the power unit 11. Mounted between the power unit 11 and the rear frame 6 is a rear shock absorber, not shown.

The periphery of the vehicle body frame 10 is covered by a vehicle body cover 13 with a seat 14 for a rider being disposed at the rear on the upper surface of the vehicle body cover 13. A step floor 15, on which the feet of the rider are placed, is formed forwardly of the seat 14. A storage box 12 is provided below the seat 14, which is opened and closed by the seat 14 and is functioned as a utility space for storing, for example, a helmet, baggage, or the like.

Figure 2:
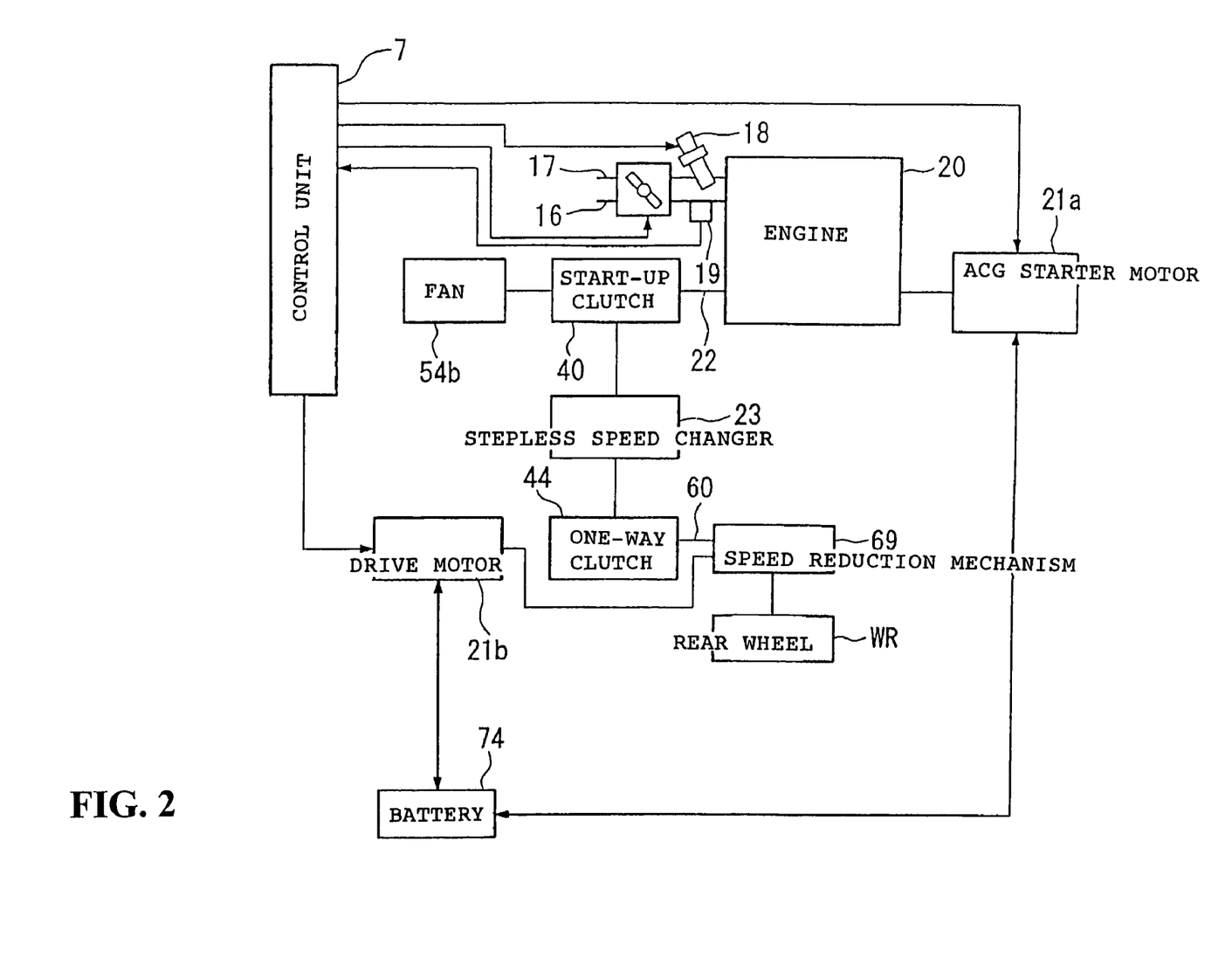
FIG. 2 is a block diagram showing a system structure of the motorcycle shown in FIG. 1.

As shown in FIG. 2, the power unit 11 includes an engine 20, which is an internal combustion engine for generating an output by burning a combustible air-fuel mixture with an ACG starter motor 21a which functions as a starter and a power generator. A stepless speed changer 23 is connected to a crankshaft 22 of the engine 20 for transmitting rotational power of the engine 20 to the rear wheel WR with a start-up clutch 40 for connecting and disconnecting the power transmission between the crankshaft 22 and the input side of the stepless speed changer 23. A drive motor 21b functions as a dynamotor or a power generator with a one-way clutch 44 for transmitting the rotational power only from the engine 20 and the drive motor 21b to the side of the rear wheel WR according to the input number of the revolutions. A speed reduction mechanism 69 is provided for reducing the speed of the rotational power from the stepless speed changer 23 and transmitting it to the rear wheel WR.

The rotational power from the engine 20 is transmitted from the crankshaft 22 to the rear wheel WR via the start-up clutch 40, the stepless speed changer 23, the one-way clutch 44, a driven shaft, power transmission shaft, 60 disposed on the output side of the stepless speed changer 23, and the speed reduction mechanism 69.

On the other hand, power from the drive motor 21b is transmitted to the rear wheel WR via the driven shaft 60, and the speed reduction mechanism 69. In other words, the driven shaft 60 which serves as a drive shaft of the rear wheel WR via the speed reduction mechanism 69 also corresponds to the output shaft of the drive motor 21b.

A battery 74 is connected to the ACG starter motor 21a and the drive motor 21b. The battery 74 supplies electric power to the motors 21a, 21b when the drive motor 21b functions as the dynamotor, and when the ACG starter motor 21a functions as the starter. When the ACG starter motor 21a and the drive motor 21b function as the power generators, regenerative electric power therefrom is charged. Control of the engine 20, the ACG starter motor 21a, and the drive motor 21b is performed by a control unit 7 which is a control means including a CPU (Central Processing Unit), a ROM (Read Only Memory) and a RAM (Random Access Memory) and so on.

The engine 20 is configured to intake and burn an air-fuel mixture including air and fuel from an air-intake pipe 16, and a throttle valve 17 for controlling the amount of air that is rotatably provided in the air-intake pipe 16. The throttle valve 17 is rotated by the operating amount of a throttle grip, not shown, which is operated by the rider. Provided between the throttle valve 17 and the engine 20 are an injector 18 for injecting fuel and a negative pressure sensor 19 for detecting negative pressure in the air-intake pipe 16, air-intake pipe negative pressure.

Figure 3:
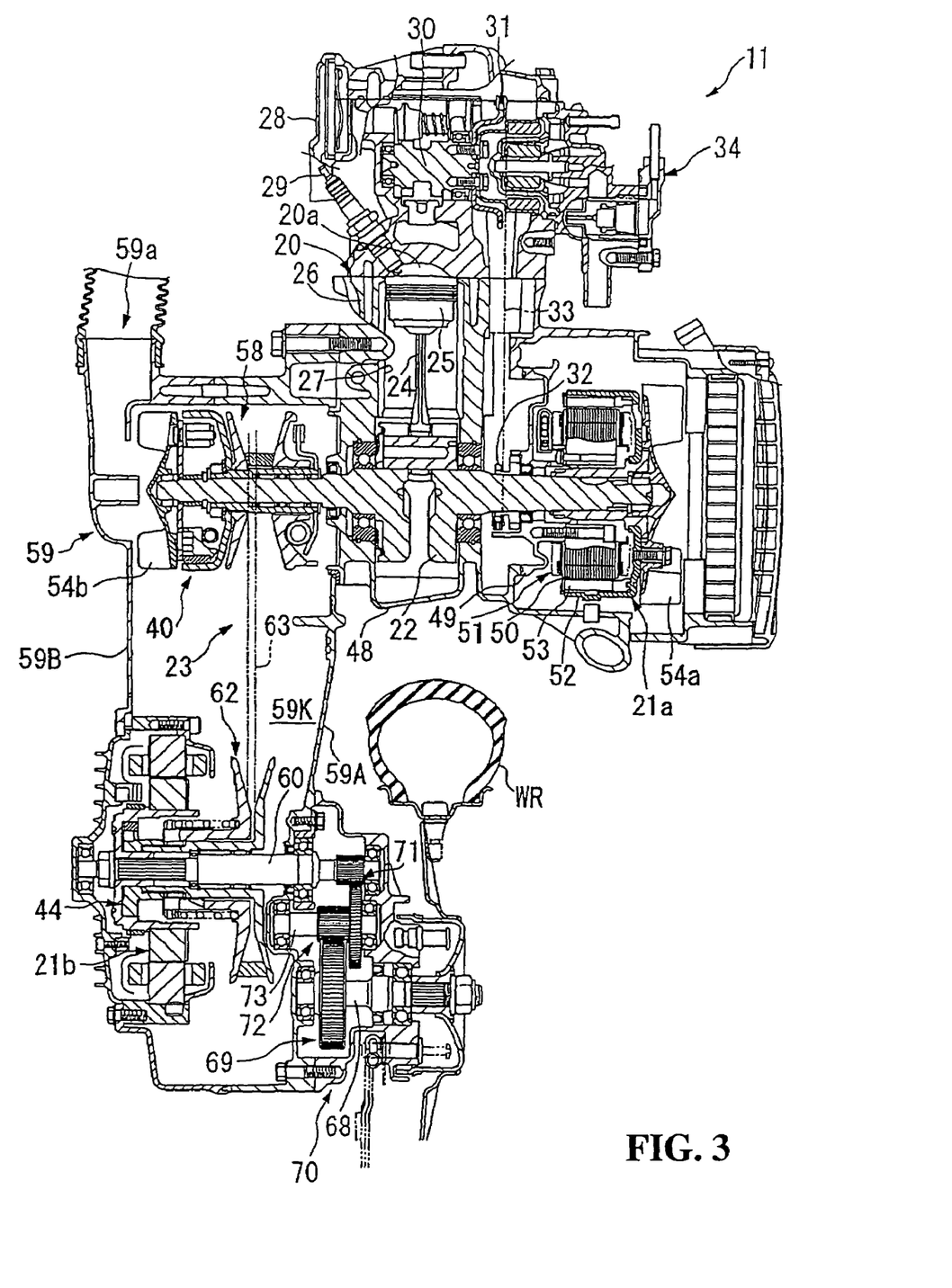
FIG. 3 is a cross-sectional view explanatory drawing of a power unit of the motorcycle shown in FIG. 1.

As shown in FIG. 3, a piston 25 is connected to the crankshaft 22 of the engine 20 via a connecting rod 24, and the piston 25 is fitted into a cylinder 27 provided in a cylinder block 26. Then, by burning an air-fuel mixture in a combustion chamber 20a defined by a cylinder head 28, the cylinder 27 and the piston 25, the piston 25 reciprocates in the cylinder 27 and the crankshaft 22 rotates to output the rotational power. An ignition plug 29 is provided for igniting air-fuel mixture.

The opening and closing of a valve, not shown, for controlling an intake or an exhaust of the air-fuel mixture to/from the combustion chamber 20a is performed by rotating a camshaft 30 supported by the cylinder head 28. A driven sprocket 31 is provided on the right end of the camshaft 30, and an endless cam chain 33 is wound around the driven sprocket 31 and the drive sprocket 32 provided on the right end of the crankshaft 22. A water pump 34 is provided on the camshaft 30 on the right side of the driven sprocket 31, and the water pump 34 works as the camshaft 30 rotates.

A stat or case 49 is connected to the right side of a crankcase 48 which supports the crankshaft 22, and the ACG starter motor 21a is stored within the stat or case 49. The ACG starter motor 21a is a motor of so-called an outer rotor system, and the stat or is a coil 51 formed by winding a conductor wire wired on teeth 50 fixed to the stat or case 49. An outer rotor 52 has a substantially cylindrical shape covering the outer periphery of the stat or, and is provided with a magnet 53 on the inner peripheral surface thereof. The outer rotor 52 is coaxially fixed to the crankshaft 22 with a fan 54a for cooling the ACG starter motor 21a being mounted to the left side of the outer rotor 52.

A power transmission case 59 extends towards the rear wheel WR and is connected to the left side of the crankcase 48. The power transmission case 59 can be divided into a case body 59A which constitutes an inside, right side, portion thereof in terms of the vehicle width direction and a cover 59B to be mounted from the outside (left side) of the case body 59A in terms of the vehicle width direction. In a space 59K defined therein for storing a fan 54b fixed to the left end of the crankshaft 22, the start-up clutch 40, the stepless speed changer 23 connected at the input side thereof to the crankshaft 22 via the start-up clutch 40, and the drive motor 21b connected to the output side of the stepless speed changer 23.

A cooling air intake port 59a is formed on the front left side of the power transmission case 59 in the vicinity of the fan 54b. When the fan 54b is rotated synchronously with the crankshaft 22, outside air is taken from the cooling air intake port 59a into the power transmission case 59, so that the drive motor 21b and the stepless speed changer 23 are cooled compulsorily.

The stepless speed changer 23 is configured as a so-called a belt converter including a drive side power transmission pulley 58, which is the input side to be mounted to the left end of the crankshaft 22 projecting leftwardly from the crankcase 48 in terms of the vehicle width direction via the start-up clutch 40. A driven side power transmission pulley 62 is the output side to be mounted to a driven shaft 60 supported by the power transmission case 59 along the axis in parallel with the crankshaft 22 via the one-way clutch 44. An endless V-belt, endless belt, 63 is wound on the pulleys 58, 62 so as to be interconnected therebetween. The driven shaft 60 is provided so as to penetrate through the drive motor 21b and the driven side power transmission pulley 62, and the driven shaft 60 is rotatably supported by a gear case 70, in which the power transmission case 59 and the speed reduction mechanism 69 are stored.

Figure 4:
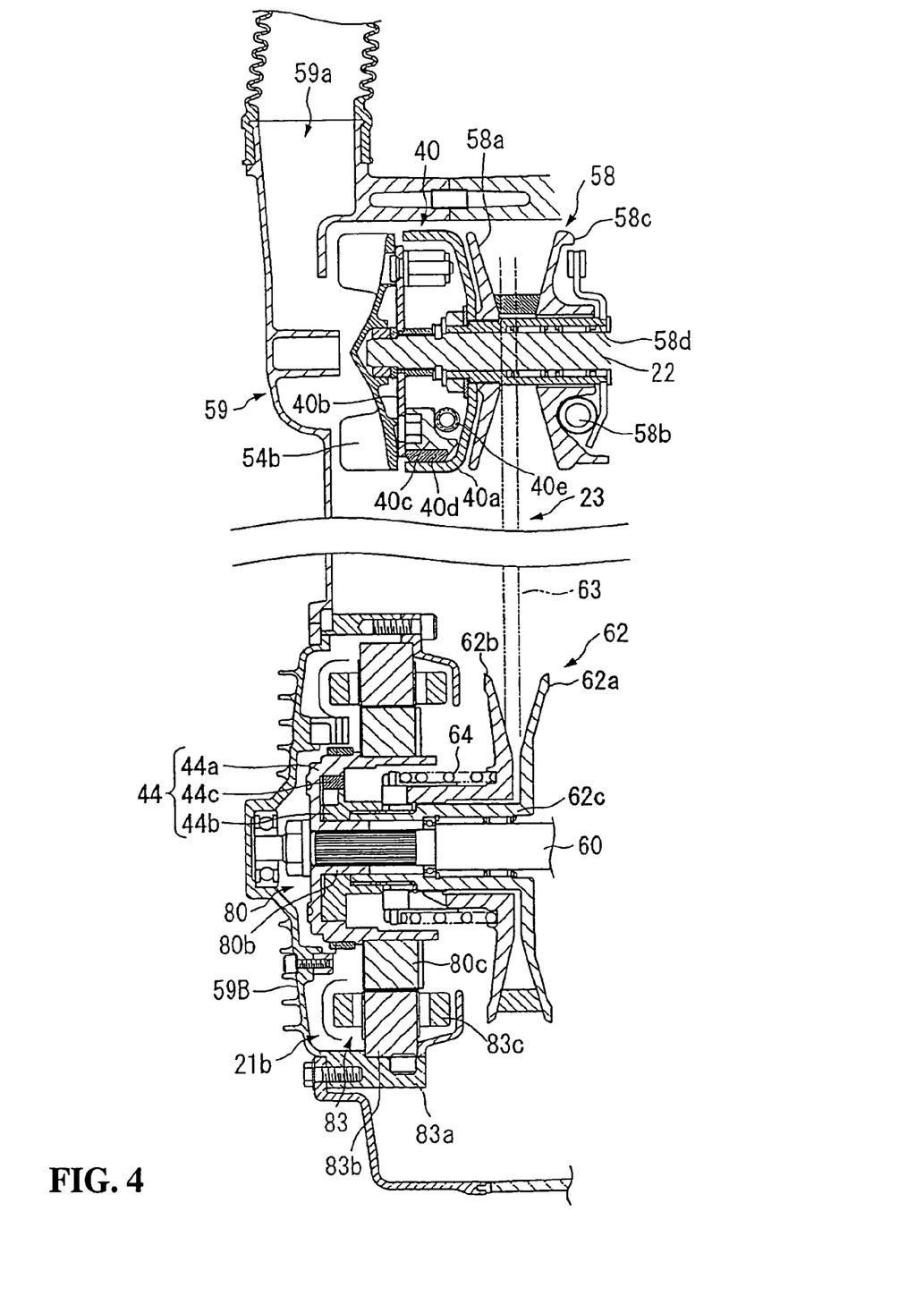
FIG. 4 is an enlarged view of the periphery of a stepless speed changer in FIG. 3.

Referring also to FIG. 4, the drive side power transmission pulley 58 is mounted to the crankshaft 22 via a sleeve 58d through which the crankshaft 22 penetrates so as to be capable of rotating in the circumferential direction, and includes a drive side fixed pulley half 58a secured on the sleeve 58d, and a drive side movable pulley half 58c, which is disposed on the outside (right side) of the drive side fixed pulley half 58a in terms of the vehicle width direction, and is mounted so as to be capable of sliding axially with respect to the sleeve 58d but not to be capable of rotating in the circumferential direction. The drive side fixed pulley half 58a and the drive side movable pulley half 58c are substantially bowl shaped. The drive side fixed pulley half 58a is disposed so that the outer peripheral side thereof is positioned inside, left side, of the inner peripheral side in the vehicle width direction with the drive side movable pulley half 58c being disposed so that the outer peripheral side thereof is positioned on the outside, left side, of the inner peripheral side in terms of the vehicle width direction.

On the other hand, the driven side power transmission pulley 62 is mounted to the driven shaft 60 passing therethrough so as to be capable of rotating in the circumferential direction, and includes a driven side fixed pulley half 62a which is restrained in a sliding movement with respect to the driven shaft 60 in the axial direction thereof with a driven side movable pulley half 62b being mounted on a boss 62c through which the driven shaft 60 of the driven side fixed pulley half 62a is passed so as to be capable of sliding movement in the axial direction thereof. The driven side fixed pulley half 62a and the driven side movable pulley half 62b are also substantially bowl shaped. The driven side fixed pulley half 62a is disposed so that the outer peripheral side thereof is positioned inside (left side) of the inner peripheral side in terms of the vehicle width direction, and the driven side movable pulley half 62b is disposed so that the outer peripheral side is positioned outside, left side, of the inner peripheral side in terms of the vehicle width direction.

The endless V-belt 63 is wound around belt grooves of a V-shape in cross section, which are formed between the drive side fixed pulley half 58a and the drive side movable pulley half 58c, and between the driven side fixed pulley half 62a and the driven side movable pulley half 62b, respectively.

A weight roller 58b is disposed inside the bowl shape of the drive side movable pulley half, that is, on the right side. Centrifugal force, generated by the rotation of the drive side power transmission pulley 58, is exerted to the weight roller 58b for moving the weight roller 58b to the outer peripheral side of the drive side power transmission pulley 58, so that the drive side movable pulley half 58c slides towards the drive side fixed pulley half 58a.

On the other hand, a spring 64 is provided on the left side of the driven side movable pulley half 62b with the driven side movable pulley half 62b being constantly urged towards the driven side fixed pulley half 62a by a resilient force of the spring 64.

In this arrangement, when the number of revolution of the crankshaft 22 increases, the centrifugal force exerted on the weight roller 58b increases on the drive side power transmission pulley 58. Thus, the drive side movable pulley half 58c slides towards the drive side fixed pulley half 58a. The drive side movable pulley half 58c moves closer to the drive side fixed pulley half 58a by the amount of this sliding movement, and the width of the groove of the drive side power transmission pulley 58 is decreased. Consequently, the contact position between the drive side power transmission pulley 58 and the V-belt 63 is shifted radially outwardly of the drive side power transmission pulley 58, whereby the winding diameter of the V-belt 63 is increased. Accordingly, the width of the groove on the driven side power transmission pulley 62 formed by the driven side fixed pulley half 62a and the driven side movable pulley half 62b is increased. In other words, the winding diameter, diameter of transmission pitch, of the V-belt 63 is continuously changed according to the number of revolution of the crankshaft 22, and the gear-change ratio is changed automatically and steplessly.

The start-up clutch 40 includes a cup-shaped outer case 40a secured to the sleeve 58d, an outer plate 40b secured to the left end of the crankshaft 22, a shoe 40d attached to the outer edge of the outer plate 40b via a weight 40c so as to face radially outwardly, and a spring 40e for urging the shoe 40d radially inwardly.

The start-up clutch 40 is disposed outside, left side in this embodiment, of the stepless speed changer 23 in terms of vehicle width direction, between the drive side fixed pulley half 58a and the fan 54b, and in the vicinity of the cooling air intake port 59a formed on the power transmission case 59.

In this arrangement, when the number of revolutions of the engine 20, that is, the number of revolutions of the crankshaft 22 is equal to or smaller than a predetermined value, 3000 rpm for example, which exceeds the number of revolution for idling, the start-up clutch 40 blocks power transmission between the crankshaft 22 and the stepless speed changer 23, while when the number of revolutions of the engine 20 exceeds the predetermined value, the centrifugal force exerted to the weight 40c works against an urging force of the spring 40e which works radially inwardly and hence the weight 40c moves radially outwardly, whereby the shoe 40d presses the inner peripheral surface of the outer case 40a by a force larger than the predetermined value and the crankshaft 22 is connected to the sleeve 58d via the start-up clutch 40. Accordingly, the rotational power of the crankshaft 22 is transmitted to the sleeve 58d via the start-up clutch 40, whereby the drive side power transmission pulley 58 fixed to the sleeve 58d is driven.

The one-way clutch 44 includes a cup-shaped outer clutch 44a, an inner clutch 44b coaxially inserted into the outer clutch 44a, and a roller 44c which enables transmission of power only in one direction from the inner clutch 44b to the outer clutch 44a. The outer clutch 44a serves also as the inner rotor body of the drive motor 21b, and is configured of the same material as the inner rotor body. Thereafter, the inner periphery of the boss of the inner rotor body and the outer periphery of the driven shaft 60 which serves as the drive shaft of the rear wheel WR are spline fitted via the speed reduction mechanism 69, and the inner periphery of the inner clutch 44b and the left end of the boss 62c of the driven side fixed pulley half 62a are spline fitted.

In this arrangement, power from the engine 20 transmitted to the driven side power transmission pulley 62 of the stepless speed changer 23 is transmitted to the rear wheel WR via the driven side fixed pulley half 62a, the inner clutch 44b, the outer clutch 44a, that is, the inner rotor body, the driven shaft 60, and the speed reduction mechanism 69, while power from the rear wheel WR side generated when the rider pushes the vehicle manually or during regenerative operation is transmitted to the speed reduction mechanism 69, the driven shaft 60, the inner rotor body, that is, the outer clutch 44a. However, since the outer clutch 44a runs idle with respect to the inner clutch 44b, such power is not transmitted to the stepless speed changer 23 and the engine 20.

The drive motor 21b is provided in such a manner that the driven shaft 60 is disposed in parallel with the vehicle width direction and serves as a motor output shaft on the rear side of the power transmission case 59. In other words, in the drive motor 21b, the driven shaft 60, which is an input shaft to the speed reduction mechanism 69, serves also as a motor output shaft for reducing the speed of the power from the drive motor 21b by the speed reduction mechanism 69 provided generally between the stepless speed changer 23 and the rear wheel WR and transmitting the same to the rear wheel WR. Accordingly, in comparison with the power unit which is not provided with the speed reduction mechanism 69 between the stepless speed changer 23 and the rear wheel WR and is directly connected to the motor, an increase in the number of components due for providing the speed reduction mechanism can be prevented. In the alternative, the drive motor 21b can be downsized.

An inner rotor 80 includes an inner rotor body which is formed into a cup shape and is spline fitted to the driven shaft 60 at a boss 80b formed at the center thereof. The inner clutch 44b is provided with a magnet 80c disposed on the outer peripheral surface of the opening side of the inner clutch 44b. On the other hand, a stat or 83 is configured by a coil 83c formed by winding a conductor wire on teeth 83b fixed to a stat or case 83a in the power transmission case 59.

In this arrangement, the drive motor 21b functions as a dynamotor when assisting the output of the engine 20 and also serves as a power generator for converting the rotation of the driven shaft 60 into electric energy and for performing a regenerative charging to the battery 74.

The speed reduction mechanism 69 is provided in a gear case 70 which continues from the power transmission case 59 on the right side of the rear end thereof. The speed reduction mechanism 69 is provided with an intermediate shaft, power transmission shaft, 73 which is supported in parallel with the driven shaft 60 and an axle 68 of the rear wheel WR. The driven shaft 60 and the intermediate shaft 73 are connected by a first speed reduction gear pair 71, and the intermediate shaft 73 and the axle 68 are connected by a second speed reduction gear pair 72.

In this arrangement, the rotational power of the driven shaft 60 is transmitted to the axle 68 after being reduced in speed at a predetermined speed reduction ratio via the first speed reduction gear pair 71 and the second speed reduction gear pair 72, whereby the rear wheel WR is driven so as to cause the motorcycle 1A to be started and traveled.

In the hybrid vehicle with the arrangement as described above, when starting the engine, the crankshaft 22 is rotated by the use of the ACG starter motor 21a on the crankshaft 22. At this time, the start-up clutch 40 is not connected, and power transmission from the crankshaft 22 to the stepless speed changer 23 is blocked. Thereafter, an air-fuel mixture taken into the cylinder 27 synchronously with the rotation of the crankshaft 22 is caused to be burned by the ignition plug 29, thereby reciprocating the piston 25.

When the number of revolutions of the crankshaft 22 exceeds a predetermined value, 3000 rpm, for example, corresponding to the operating amount of the throttle grip, the rotational power of the crankshaft 22 is transmitted to the stepless speed changer 23, the one-way clutch 44, and the speed reduction mechanism 69 via the start-up clutch 40, thereby driving the rear wheel WR.

When starting up, it is also possible to activate the drive motor 21b by power distribution from the battery 74, and assist the rotation of the driven shaft 60 by the engine power.

Instead of a start-up by the engine 20, a start-up only by the drive motor 21b is also possible. In this case, since the rotation of the driven shaft 60 by the drive motor 21b is not transmitted to the driven side power transmission pulley 62 by the one-way clutch 44, the stepless speed changer 23 is not driven. Accordingly, when the rear wheel WR is driven only by the drive motor 21b for traveling, the energy transmission efficiency is improved.

When traveling only by use of the engine 20 and when a load during acceleration or during travel at a high speed is significant, the drive motor 21b may be used to assist with regard to the engine. At this time, the rotational power of the crankshaft 22 caused by the reciprocal motion of the piston 25 is transmitted to the driven shaft 60 via the start-up clutch 40, the stepless speed changer 23, and the one-way clutch 44, and the power from the drive motor 21b is also transmitted thereto via the one-way clutch 44, whereby the rear wheel WR is driven by the combined power via the speed reduction mechanism 69.

In contrast, when traveling only by use of the drive motor 21b, the engine 20 may be used to assist with regard to the motor.

When traveling at a constant speed, cruise traveling, in the case where only the drive motor 21b is used as a power source, even when the engine 20 is driven, power can be generated by the ACG starter motor 21a without driving the stepless speed changer 23 as long as the number of revolution of the engine 20 does not exceed the number of revolution when the start-up clutch 40 is connected, the above-described predetermined value.

In the case where only the drive motor 21b is used as a power source during traveling at a constant speed, power transmission from the drive motor 21b to the rear wheel WR is performed without driving the stepless speed changer 23. Thus, a high energy transmission efficiency is achieved.

When reducing the speed, since the one-way clutch 44 does not transmit the rotation of the driven shaft 60 to the driven side power transmission pulley 62 of the stepless speed changer 23, rotation of the axle 68 can be regenerated at the drive motor 21b directly via the speed reduction mechanism 69 without driving the stepless speed changer 23.

In other word, since the power transmitted from the rear wheel WR to the drive motor 21b during a regenerative operation from the rear wheel WR to the drive motor 21b is not consumed for driving the stepless speed changer 23, the charging efficiency at the time of regeneration is improved.

Figure 5:
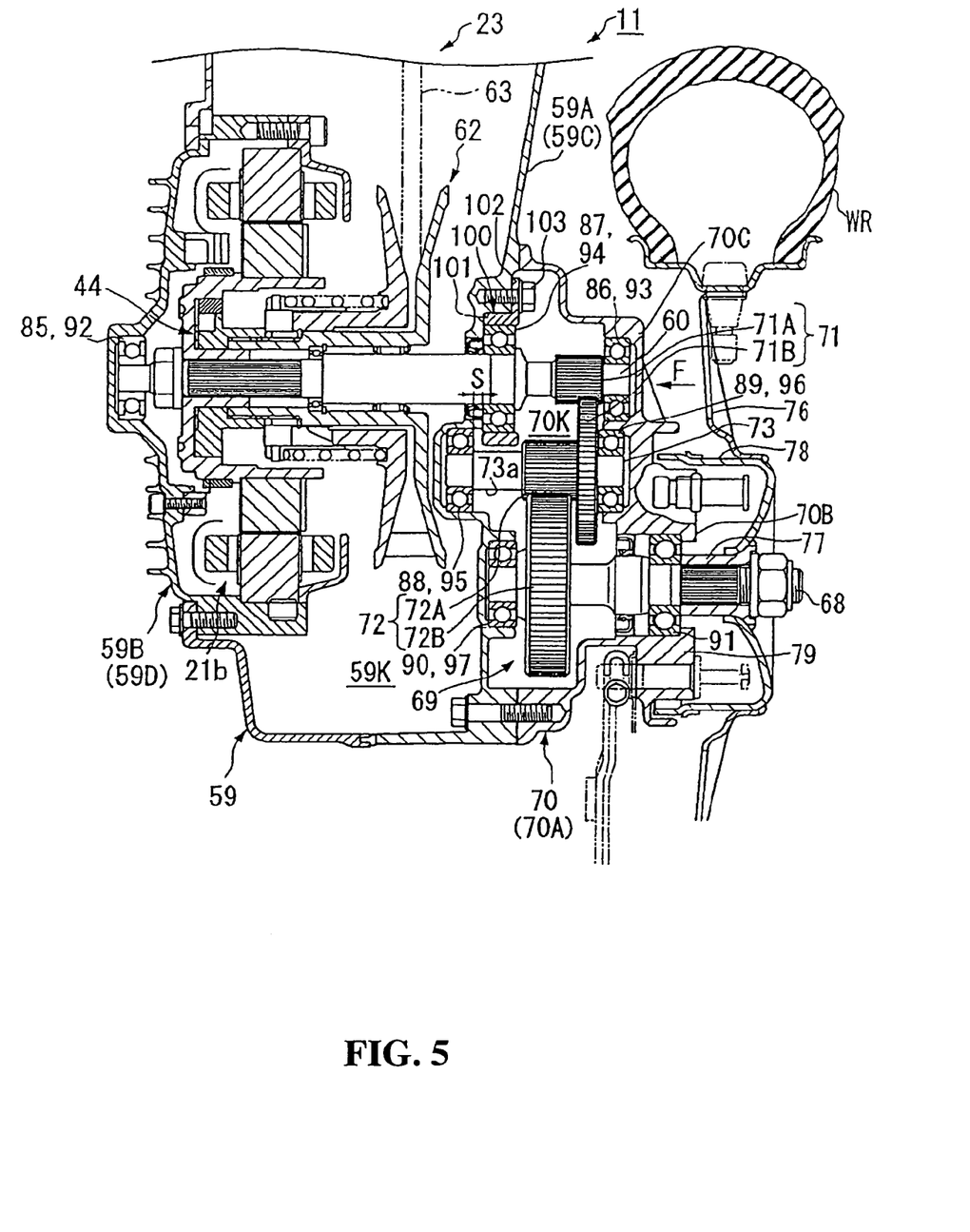
FIG. 5 is an enlarged view of the periphery of a speed reduction mechanism in FIG. 3.

Subsequently, the speed reduction mechanism 69 is described in detail.

As shown in FIG. 5, the gear case 70 is composed of a container-shaped case body 70A having an opening on the outside in terms of the vehicle width direction with part of an inner wall portion 59C of the power transmission case 59, case body 59A, to which the opening side of the case body 70A faces. In addition, the case body 70A is fixed to the inner wall potion 59C of the power transmission case 59 in a state in which the opening thereof is closed by the inner wall portion 59C.

The driven shaft 60, which is an input shaft of the speed reduction mechanism 69, is provided in such a manner that the right portion thereof is penetrated through the inner wall portion 59C of the power transmission case 59 and projects into a space 70K within the gear case 70. The left end portion of the driven shaft 60 is rotatably supported by a radial ball bearing 85, which is a bearing disposed on the side of a space 59K of an outer wall portion 59D of the power transmission case 59, cover 59B. The right end portion of the driven shaft 60 is rotatably supported by a radial ball bearing 86, which is a bearing disposed on the side of a space 70K of a bottom wall portion, inner wall portion, 70C of the gear case 70. The right portion of the driven gear 60 is rotatably supported also by a radial ball bearing 87, the second bearing, which is a bearing disposed on the side of the gear case 70 of the inner wall portion 59C of the power transmission case 59. Disposed at the right end portion of the driven shaft 60 between the both radial ball bearings 86, 87 which support the right portion and adjacent to the radial ball bearing 86 on the right end side, a small-diameter gear 71A is integrally formed on the outer periphery thereof.

The intermediate shaft 73 of the speed reduction mechanism 69 is integrally fixed on the right portion thereof with a large-diameter gear 71B which meshes with the small-diameter gear 71A on the driven shaft 60. The large-diameter gear 71B and the small-diameter gear 71A of the driven shaft 60 constitute the first speed reduction gear pair 71. At a portion of the intermediate shaft 73 on the left side of the large-diameter gear 71B a small-diameter gear 72A is integrally formed on the outer periphery thereof. The left end of the intermediate gear 73 is rotatably supported by a radial ball bearing 88, the first bearing, which is a bearing disposed at the inner wall portion 59C of the power transmission case 59 on the side of the space 70K of the gear case 70. The right end of the intermediate shaft 73 is rotatably supported by a radial ball bearing 89, which is a bearing disposed on the bottom wall portion 70C of the gear case 70 on the side of the space 70K. The portion of the intermediate shaft 73 between the small-diameter gear 72A and the radial ball bearing 88 on the left end side is a general-diameter portion 73a of the intermediate shaft 73. Thus, the maximum outer diameter, outer diameter of addendum circle, of the small-diameter gear 72A is larger than the outer diameter thereof.

The axle 68, which is an output shaft of the speed reduction mechanism 69, is penetrated through a hub portion 70B provided on the bottom wall portion 70C of the gear case 70 and is spline connected to a hub portion 77 of a wheel 76 of the rear wheel WR. A brake drum 78 formed so as to surround the hub portion 77 is integrally provided on the inner peripheral side of the wheel 76. A drum brake device of the rear wheel WR is configured of the brake drum 78 and a base portion 79 provided integrally on the right side of the gear case 70. The left end portion of the axle 68 is rotatably supported by a radial ball bearing 90, which is a bearing provided at the inner wall portion 59C of the power transmission case 59 on the side of the space 70K of the gear case 70. The right portion of the axle 68 is rotatably supported by a radial ball bearing 91, which is a bearing disposed within the hub portion 70B of the gear case 70 provided on the axle 68 between both radial ball bearing 90, 91 which support the left end portion and the right portion of the axle 68. Adjacent to the radial ball bearings 90 on the left end side, a large-diameter gear 72B which meshes with the small-diameter gear 72A of the intermediate shaft 73, is integrally fixed therewith. The large-diameter gear 72B and the small-diameter gear 72A of the intermediate shaft 73 constitute the second speed reduction gear pair 72.

The radial ball bearing 85 on the left end side of the driven shaft 60 is disposed within a storage section 92 which is formed by shifting part of the outer wall portion 59D of the power transmission case 59 leftwardly. The storage section 92 has an inner peripheral surface which aligns with the outer peripheral surface of the outer race of the radial ball bearing 85. Therefore, by press-fitting the radial ball bearing 85 from the space 70K of the gear case 70 leftwardly into the storage section 92, the radial ball bearing 85 is supported by the outer wall portion 59D over the entire perimeter thereof.

Likewise, by mounting the radial ball bearing 86 on the right end side of the driven gear 60 from the side of the space 70K of the gear case 70 rightwardly into a storage section 93 provided on the bottom wall portion 70C of the gear case 70, the radial ball bearing 86 is supported over the entire perimeter thereof.

By mounting the radial ball bearing 88 on the left end side of the intermediate shaft 73 from the side of the space 70K of the gear case 70 leftwardly into a storage section, recessed portion, 95 which is formed by shifting part of the inner wall portion 59C of the power transmission case 59 leftwardly, the radial ball bearing 88 is supported by the inner wall portion 59C over the entire perimeter thereof, and by mounting the radial ball bearing 89 on the right end side of the intermediate shaft 73 from the side of the space 70K of the gear case 70 rightwardly into a storage section 96 provided on the bottom wall portion 70C of the gear case 70, the radial ball bearing 89 is supported by the bottom wall portion 70C over the entire periphery thereof.

By mounting the radial ball bearing 90 on the left end side of the axle 68 from the side of the space 70K of the gear case 70 leftwardly into a storage section 97 provided on the inner wall portion 59C of the power transmission case 59, the radial ball bearing 90 is supported by the inner wall portion 59C over the entire perimeter thereof. In addition, by mounting the radial ball bearing 91 on the right portion of the axle 68 rightwardly from the side of the space 70K of the gear case 70 rightwardly into the hub portion 70B of the gear case 70, the radial ball bearing 91 is supported by the hub portion 70B over the entire perimeter thereof.

The radial ball bearing 87 for supporting the right portion of the driven shaft 60 is attached to the power transmission case 59 via a separate bearing holder 100.

Figure 6:
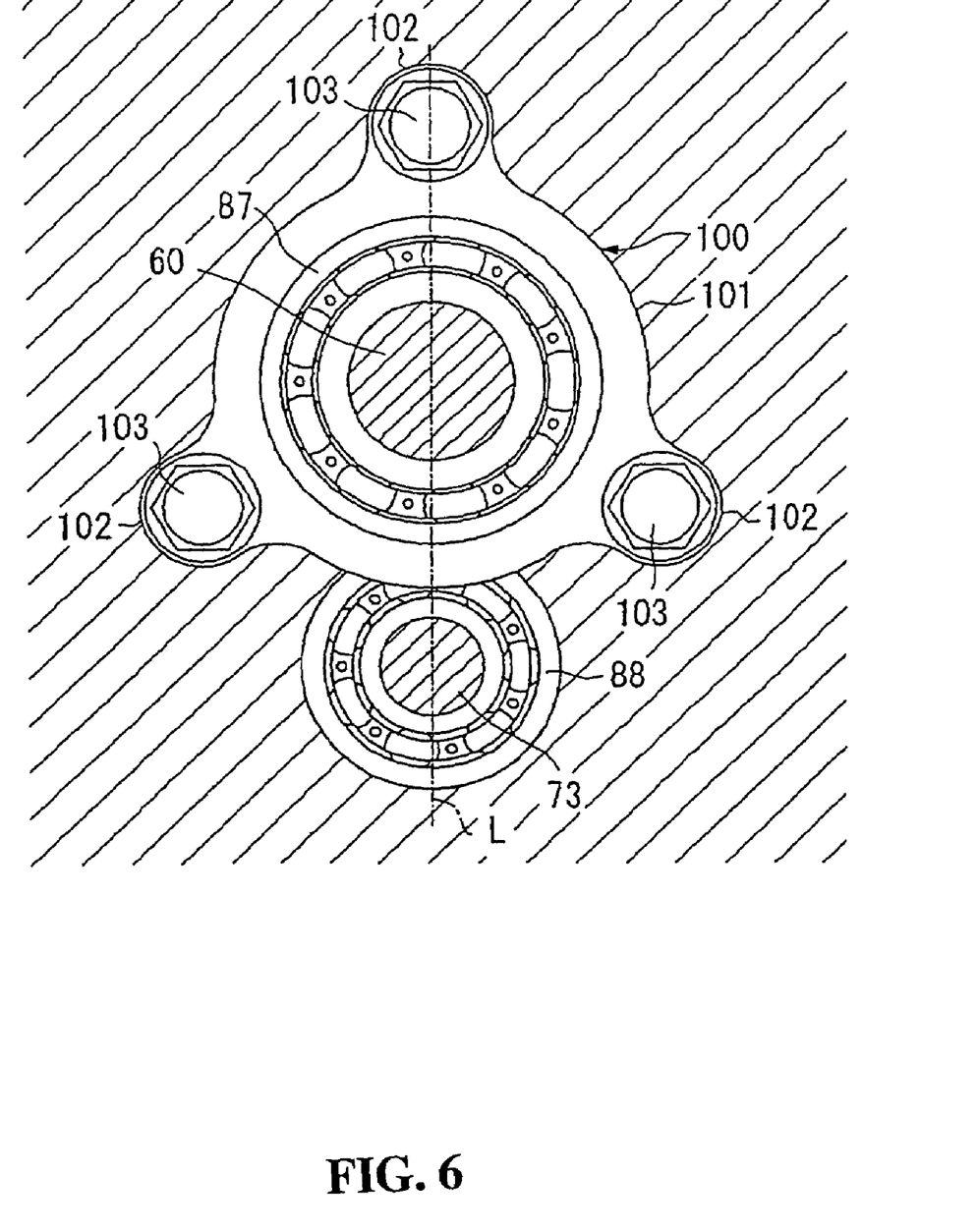
FIG. 6 is a view of the periphery of a driven shaft and an intermediate shaft of the speed reduction mechanism when viewed in the direction indicated by an arrow F in FIG. 5.

Referring also FIG. 6, the bearing holder 100 includes an annular holder body 101 which surrounds the radial ball bearing 87, and three fixing flanges 102 extending from the right end portion of the holder body 101 towards the outer periphery thereof formed integrally with each other. The respective fixing flanges 102 are disposed at substantially regular intervals in the circumferential direction of the holder body 101, and the bearing holder 100 is fixed to the inner wall portion 59C when bolts 103 which penetrate through the respective fixing flanges 102 are tightened into the inner wall portion 59C.

Two of the fixing flanges 102 are provided on the holder body 101 on the side of the intermediate shaft 73 so as to be substantially symmetrical with respect to a straight line L connecting the shaft center of the driven shaft 60 and the shaft center of the intermediate shaft 73 as illustrated in the side view in FIG. 6. The remaining one of the flanges is provided on the holder body 101 at the position opposite from the intermediate shaft 73. This is for preventing the fixing bolts 103 from being disposed between the driven shaft 60 and the intermediate shaft 73.

The holder body 101 includes an inner peripheral surface which aligns with the outer peripheral surface of the outer race of the radial ball bearing 87. By mounting the radial ball bearing 87 into the holder body 101 by press-fitting or the like, the radial ball bearing 87 is retained in a state of being surrounded by the bearing holder 100 over the entire perimeter thereof. By mounting and fixing the bearing holder 100 from the side of the space 70K of the gear case 70 leftwardly into a mounting portion 94 of the inner wall portion 59C of the power transmission case 59, the radial ball bearing 87 is supported by the inner wall portion 59C via the bearing holder 100 over the entire perimeter thereof.

The bearing holder 100 and the radial ball bearing 87 retained thereby are disposed so that the portion on the side of the intermediate shaft 73 is partly overlapped with the portion of the radial ball bearing 88 on the left end side of the intermediate shaft 73 on the side of the driven shaft 60 when viewed in the axial direction, lateral direction. The radial ball bearing 89 on the right end side of the intermediate shaft 73 is a component identical to the radial ball bearing 88 on the right end side, and these ball bearings are disposed coaxially. Therefore, the bearing holder 100 and the radial ball bearing 87 are overlapped also with the radial ball bearing 89 in an axial view.

In addition, since the radial ball bearing 88 on the left end side of the intermediate shaft 73 is stored in the storage section 95 which is formed by shifting part of the inner wall portion 59C of the power transmission case 59 leftwardly, the bearing holder 100 and the radial ball bearing 87 are located between the radial ball bearing 88 on the left end side of the intermediate shaft 73 and the small-diameter gear 72A in the axial direction. In addition, the bearing holder 100 and the general-diameter portion 73a of the intermediate shaft 73 are disposed close to each other so that the portion of the bearing holder 100 on the side of the intermediate shaft 73 is partly overlapped with the maximum outer diameter portion of the small-diameter gear 72A on the side of the driven shaft in axial view. Consequently, the distance between the driven shaft 60 and the intermediate shaft 73 are reduced, and the diameters of the respective gears 71A and 72B which constitute the first speed reduction gear pair 71 for linking the driven gear 60 and the intermediate shaft 73 are reduced.

Since the storage section 95 in which the radial ball bearing 88 on the left end side of the intermediate shaft 73 are disposed is formed into a recessed shape on the inner wall portion 59C of the power transmission case 59 when viewed from the side of the space 70K of the gear case 70, by disposing the radial ball bearing 88 in this storage section 95, the space for disposing components in the space 70K of the gear case 70 can be increased. Although the storage section 95 is formed into a projecting shape on the inner wall portion 59C of the power transmission case 59 when viewed from the space 59K of the power transmission case 59, since the storage section 95 is provided so as to be positioned on the inner side of the bowl-shaped driven side fixed pulley half 62a, the influence to the space for disposing the components in the space 59K is constrained, whereby lowering of flexibility of layout of the stepless speed changer 23 is prevented.

By disposing the radial ball bearing 88 axially between the set of the bearing holder 100 and the radial ball bearing 87 and the inner wall portion 59C, the bottom wall portion of the storage section 95, the bearing holder 100 and the radial ball bearing 87 serve also as a stopper for preventing the bearing holder 100 and the radial ball bearing 87 from coming off from the storage section 95 of the radial ball bearing 88. Since a space S is formed between the radial ball bearing 88 and the set of the bearing holder 100 and the radial ball bearing 87 in the axial direction, the parts tolerance of the respective radial ball bearings 87, 88 and the bearing holder 100 in the axial direction, and the mounting tolerance with respect to the inner wall portion 59C can be absorbed. The radial ball bearing 88 which is disposed within the storage section 95 that is formed by shifting part of the inner wall portion 59C leftward is disposed on the far side, that is, the left side, of the radial ball bearing 87 in terms of the mounting direction of the respective radial ball bearings 87, 88. In other words, the radial ball bearing 87 is disposed on the front side, that is, the right side, of the radial ball bearing 88 in the mounting direction.

The first embodiment employs an arrangement structure of bearings in which the driven shaft 60 and the intermediate shaft 73, which are disposed to be substantially parallel to each other and linked to each other, are rotatably supported via the radial ball bearings 87, 88, respectively. The respective radial ball bearings 87, 88 are disposed so as to be overlapped partly with each other in an axial view with the center distance between the driven shaft 60 and the intermediate shaft 73 being reduced and diameters of the small-diameter gear 71A and the large-diameter gear 71B which link the shafts 60, 73 being reduced, respectively, in comparison with the case in which the respective radial ball bearings 87, 88 are disposed in a juxtaposed manner so as to extend along the inner wall portion 59C of the power transmission case 59 which supports the respective radial ball bearings 87, 88.

Therefore, downsizing of the rear portion of the power unit 11 including the gear case 70 is achieved, and weight reduction by reducing the diameters of the respective gears 71A, 71B is also achieved. In particular, in the motorcycle 1A of a unit swing type, the weight reduction of the rear portion, which corresponds to the distal side of swinging motion of the power unit 11 which is located below the spring, is very effective in terms of the traveling performance of the motorcycle 1A.

In the arrangement structure of the bearings described above, since the respective radial ball bearings 87, 88 are mounted from the side of the space 70K of the gear case 70 leftwardly into the inner wall portion 59C which supports the radial ball bearings 87, 88, when assembling the speed reduction mechanism 69 which includes the radial ball bearings 87, 88, the radial ball bearings 87, 88 can be mounted to the inner wall portion 59C in the same direction. In other words, the mounting properties of the respective radial ball bearings 87, 88 can be improved. Since maintenance of the radial ball bearings 87, 88 can be performed in the same direction by removing the gear case 70, maintenanceability of the respective radial ball bearings 87, 88 can be improved.

In the arrangement structure for bearings as described above, since the storage section 95 is formed on the inner wall portion 59C for supporting the respective radial ball bearings 87, 88 so that the radial ball bearing 88 is arranged on the far side with respect to the radial ball bearing 87 in terms of the mounting direction of the radial ball bearings 87, 88, when mounting the respective radial ball bearings 87, 88 on the inner wall portion 59C, the radial ball bearing 88 is mounted to the inner wall portion 59C in a state in which the radial ball bearing 88 is disposed within the storage section 95 so as to dispose the same in the far side in terms of the mounting direction, thereafter, the radial ball bearing 87 is mounted to the inner wall portion 59C. Accordingly, the respective radial ball bearings 87, 88 can be easily mounted, whereby assembleability of the ball bearings can be further improved.

Since the radial ball bearing 88 is disposed within the recessed storage section 95, even when the positions to arrange the radial ball bearings 87, 88 are shifted in the axial direction so as to overlap with each other in an axial view, the space 70K in the gear case 70 is not reduced. In contrast, since the radial ball bearing 88 is stored in the storage section 95, the space for arranging the parts in the space 70K can be increased. In this manner, an efficient arrangement of the radial ball bearing 88 is enabled, whereby further downsizing of the power unit 11 including the gear case 70 is achieved.

Furthermore, in the arrangement structure for bearings as described above, since the bearing holder 100 for surrounding and retaining the radial ball bearing 88 is provided, and the radial ball bearing 88 is mounted to the inner wall portion 59C via the bearing holder 100, the radial ball bearing 88 can be supported via the bearing holder 100 over the entire perimeter thereof. In other words, the mounting strength of the radial ball bearing 88 with respect to the inner wall portion 59C can be improved.

Furthermore, in the arrangement structure for bearings as described above, since the radial ball bearing 88 is disposed between the set of the bearing holder 100 and the radial ball bearing 87 and the inner wall portion 59C in the axial direction, and the set of the radial ball bearing 88 and the bearing holder 100 and the radial ball bearing 87 are disposed so as to form the space S in the axial direction, the parts tolerance of the respective radial ball bearings 87, 88 and the bearing holder 100 in the axial direction and the mounting tolerance with respect to the inner wall portion 59C can be absorbed. Thus, the mounting accuracy of the respective radial ball bearings 87, 88 and the bearing holder 100 can be improved.

Figure 7:
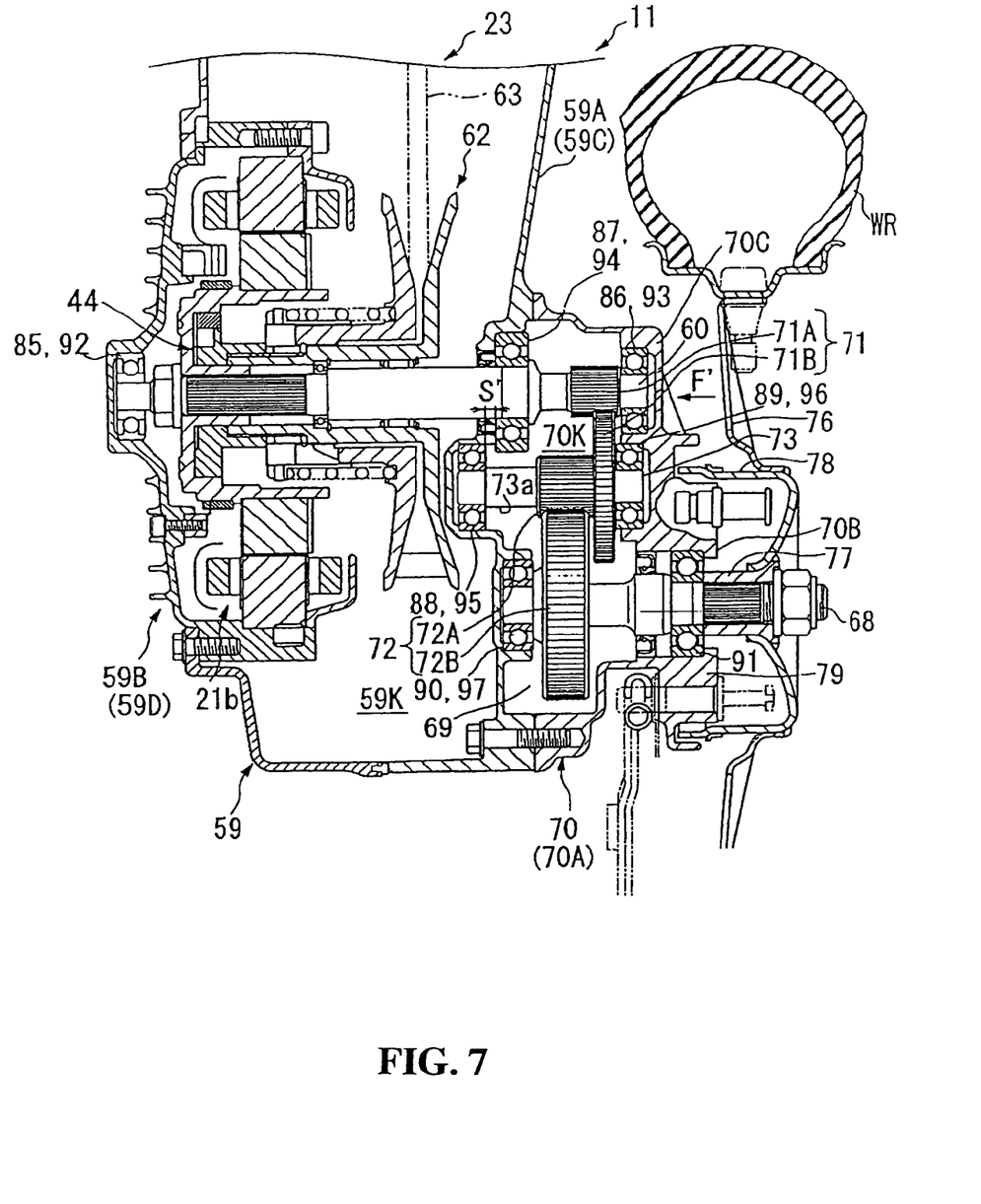
FIG. 7 is an enlarged view of a second embodiment of the present invention corresponding to FIG. 5.
Figure 8:
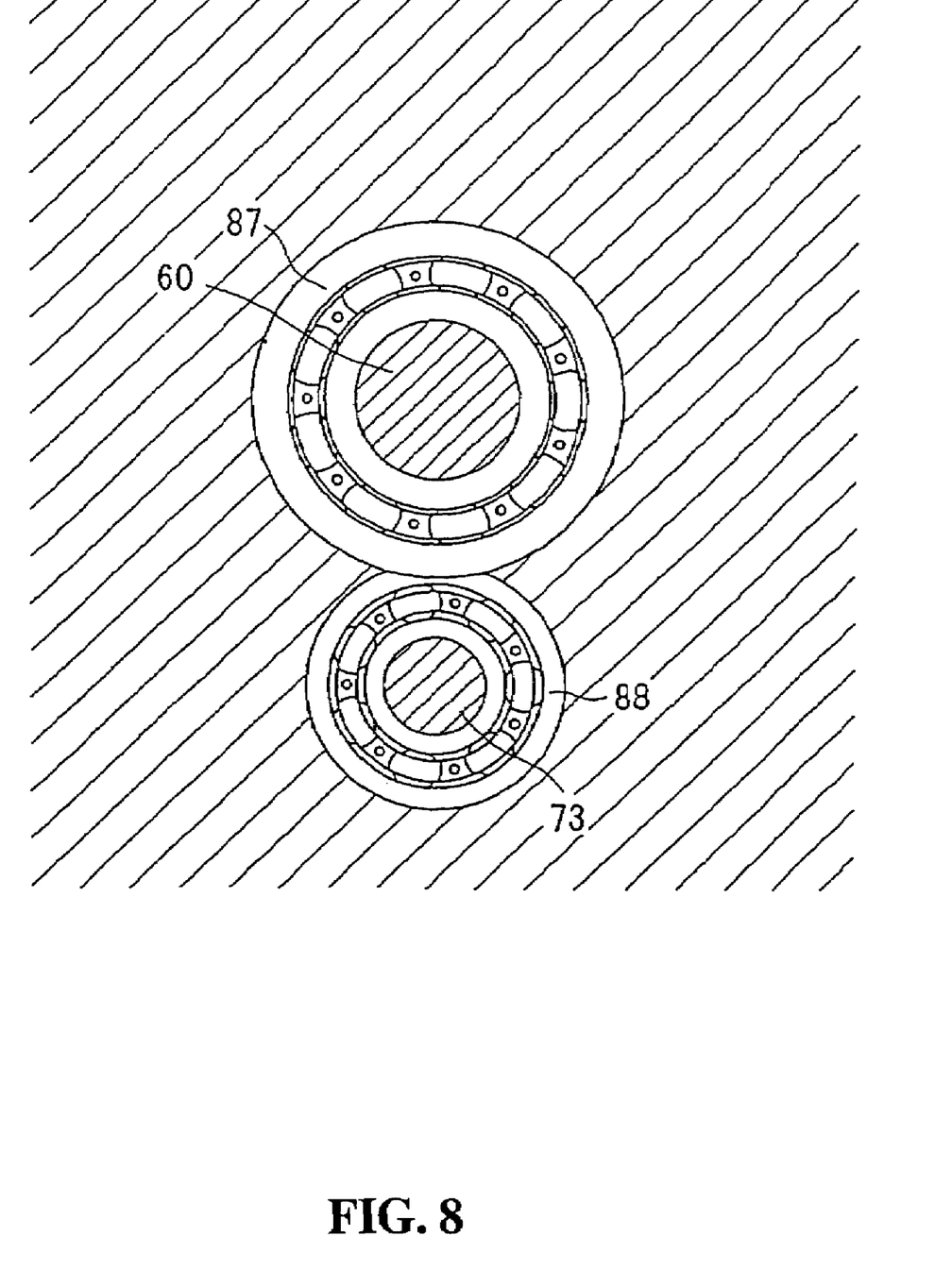
FIG. 8 is a view of the periphery of the driven shaft and the intermediate shaft in FIG. 7 when viewed in the direction of an arrow F'.

Subsequently, a second embodiment of the present invention will be described. In this second embodiment, since only the fact that the bearing holder 100 is not used is different from the first embodiment, the parts corresponding to the first embodiment are represented by the same reference numerals and the description will be omitted.

As shown in FIGS. 7 and 8, in the arrangement structure for bearings according to the second embodiment, by mounting the radial ball bearing 87 for supporting the right portion of the driven shaft 60 to the mounting portion 94 provided on the inner wall portion 59C of the power transmission case 59 leftwardly from the side of the space 70K of the gear case 70 by press-fitting or the like, the radial ball bearing 87 is supported by the inner wall portion 59C. The portion of the radial ball bearing 87 on the side of the intermediate shaft 73 is disposed so as to overlap partly with the radial ball bearing 88 on the left end side of the intermediate shaft 73 in an axial view.

In the same manner as the first embodiment, the radial ball bearing 88 is disposed between the radial ball bearing 87 and the inner wall portion 59C, the bottom wall portion of the storage section 95, in the axial direction. In addition, a space S' is formed between the respective radial ball bearings 87, 88. Furthermore, the radial ball bearing 88 disposed within the storage section 95 is disposed on the far side with respect to the radial ball bearing 87 in the mounting direction of the radial ball bearings 87, 88.

In the arrangement structure of bearings according to the second embodiment as well, as in the first embodiment, the assembleability of the radial ball bearings 87, 88 is improved and maintenanceability of the speed reduction mechanism 69 is improved in addition to the achievement of a weight reduction by downsizing of the rear portion of the power unit 11 including the gear case 70 and a reduction in the diameters of the respective gears 71A, 71B. Also, mounting accuracy of the radial ball bearings 87, 88 can be improved by absorbing the parts tolerance of the radial ball bearings 87, 88 in the axial direction and the mounting tolerance thereof with respect to the inner wall portion 59C.

The invention is not limited to the embodiments described above and, for example, the mounting strength of the radial ball bearing 88 with respect to the inner wall portion 59C can be improved by eliminating the space S or S' between the radial ball bearings 87, 88 and interposing the radial ball bearing 88 between the radial ball bearing 87 and the inner wall portion 59C, the bottom wall portion of the storage section 95, in the axial direction. Thus, the mounting strength of the radial ball bearing 88 with respect to the inner wall portion 59C can be improved.

In addition, as long as a structure is such that the respective bearings are partly overlapped in an axial view between the radial ball bearing 88 which supports the intermediate shaft 73 and the radial ball bearing 90 which supports the axle 68, or between the radial ball bearings 86, 89 which are mounted to the bottom wall portion 70C of the gear case 70, the arrangement structure for the bearings as described above can be applied.

Furthermore, when using the bearing holder 100, for example, fixation by press-fitting or the like may be employed besides the fixation to the gear case 70 using a bolt. Alternatively, a structure may be provided in which the storage section 95 is a recess formed in the vicinity thereof for simply shifting the radial ball bearing 88 leftwardly, and the radial ball bearing 88 is supported by other supporting means.

The structures in the respective embodiments are shown simply for illustration, and various modifications may be made without departing from the scope of the invention, as a mater of course.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arrangement structure for bearings comprising:
   a plurality of power transmission shafts positioned in a substantially parallel arrangement relative to each other, the power transmission shafts being rotatably supported via bearings, respectively, and arranged so that the bearings overlap partly with each other in an axial view, whereby a center-to-center distance between the power transmission shafts can be minimized;

a wall portion having a surface facing a space in which the power transmission shafts are disposed and being formed with a recess that is axially displaced from an adjacent region of the wall portion, the bearings being mounted to the surface of the wall portion substantially in the same direction;

a second bearing contacts the wall portion in the axial direction at the adjacent region; and a first bearing contacts the recess in the axial direction, whereby the first bearing is disposed on the far side of the second bearing in terms of the mounting direction of the bearings.

2. The arrangement structure for bearings according to claim 1, wherein a bearing holder is provided for surrounding and retaining the second bearing, and the second bearing is mounted to the wall portion via the bearing holder.

3. The arrangement structure for bearings according to claim 2, wherein the first bearing is disposed between the second bearing and the wall portion in the axial direction.

4. The arrangement structure for bearings according to claim 2, wherein a space is formed between the first bearing and the second bearing in the axial direction.

5. The arrangement structure for bearings according to claim 1, wherein the first bearing is disposed between the second bearing and the wall portion in the axial direction.

6. The arrangement structure for bearings according to claim 5, wherein a space is formed between the first bearing and the second bearing in the axial direction.

7. The arrangement structure for bearings according to claim 1, wherein a space is formed between the first bearing and the second bearing in the axial direction.

8. An arrangement structure for bearings comprising:

a plurality of power transmission shafts positioned to be rotatably supported via bearings, respectively, and arranged so that the bearings overlap partly with each other in an axial view, whereby a center-to-center distance between the power transmission shafts can be minimized;

a wall portion for supporting a first bearing for rotatably supporting a first power transmission shaft;

said wall portion supports a second bearing for rotatably supporting a second power transmission shaft;

said wall portion having a surface facing a space in which the power transmission shafts are disposed and being formed with a recess that is axially displaced from an adjacent region of the wall portion, said first and second bearings being mounted to the surface of the wall portion substantially in the same direction;

the second bearing contacts the wall portion in the axial direction at the adjacent region:

and the first bearing contacts the recess in the axial direction, whereby the first bearing is disposed on the far side of the second bearing in terms of the mounting direction of the bearings.

9. The arrangement structure for bearings according to claim 8, wherein a bearing holder is provided for surrounding and retaining the second bearing, and the second bearing is mounted to the first wall portion via the bearing holder.

10. The arrangement structure for bearings according to claim 9, wherein the first bearing is disposed between the second bearing and the wall portion in the axial direction.

11. The arrangement structure for bearings according to claim 9, wherein a space is formed between the first bearing and the second bearing in the axial direction.

12. The arrangement structure for bearings according to claim 8, wherein the first bearing is disposed between the second bearing and the wall portion in the axial direction.

13. The arrangement structure for bearings according to claim 12, wherein a space is formed between the first bearing and the second bearing in the axial direction.

14. The arrangement structure for bearings according to claim 8, wherein a space is formed between the first bearing and the second bearing in the axial direction.

* * * * *